(12) United States Patent
Zheng et al.

(10) Patent No.: US 12,532,391 B2
(45) Date of Patent: Jan. 20, 2026

(54) LIGHTING APPARATUS

(71) Applicant: LEEDARSON LIGHTING CO., LTD., Fujian (CN)

(72) Inventors: Bihong Zheng, Fujian (CN); Bin Zhang, Fujian (CN)

(73) Assignee: LEEDARSON LIGHTING CO., LTD., Zhangzhou (CN)

( * ) Notice: Subject to any disclaimer, the term of this patent is extended or adjusted under 35 U.S.C. 154(b) by 60 days.

(21) Appl. No.: 18/784,557

(22) Filed: Jul. 25, 2024

(65) Prior Publication Data

US 2025/0040007 A1  Jan. 30, 2025

(30) Foreign Application Priority Data

Jul. 26, 2023 (CN) .......................... 202321981564.9

(51) Int. Cl.
*H05B 45/12* (2020.01)
*H05B 45/382* (2020.01)
*H05B 45/50* (2022.01)

(52) U.S. Cl.
CPC .......... *H05B 45/12* (2020.01); *H05B 45/382* (2020.01); *H05B 45/50* (2020.01)

(58) Field of Classification Search
CPC .... H05B 45/10; H05B 45/3725; H05B 45/20; H05B 45/38; H05B 45/325; H05B 45/385
See application file for complete search history.

(56) References Cited

U.S. PATENT DOCUMENTS

| | | | | |
|---|---|---|---|---|
| 9,791,110 | B2* | 10/2017 | Hu | H05B 45/14 |
| 11,503,688 | B2* | 11/2022 | Kumar | H05B 45/3575 |
| 12,324,067 | B2* | 6/2025 | Van Bodegraven | H05B 45/39 |
| 12,324,078 | B2* | 6/2025 | Zhao | H05B 47/10 |
| 2012/0262080 | A1* | 10/2012 | Watanabe | H05B 45/10 |
| | | | | 315/210 |
| 2014/0062333 | A1* | 3/2014 | Sonobe | H02M 3/33507 |
| | | | | 315/291 |
| 2015/0028761 | A1* | 1/2015 | Vonach | H05B 45/382 |
| | | | | 315/201 |
| 2019/0036456 | A1* | 1/2019 | Coulson | H02M 3/24 |
| 2019/0394849 | A1* | 12/2019 | Wang | H05B 45/59 |
| 2020/0288549 | A1* | 9/2020 | Hsia | H05B 45/357 |
| 2022/0330402 | A1* | 10/2022 | Fang | H05B 45/325 |

* cited by examiner

*Primary Examiner* — Wei (Victor) Y Chan
(74) *Attorney, Agent, or Firm* — LANWAY IPR SERVICES; Chun-Ming Shih

(57) ABSTRACT

A lighting apparatus includes an isolation transformer, an output rectification and voltage regulation circuit, an output current limiting and filtering circuit, and a signal detection and generation circuit. The homonymous terminal of the primary side opposes the homonymous terminal of the secondary side. The output rectification and voltage regulation circuit is connected to the secondary coil of the isolation transformer. The output rectification and voltage regulation circuit rectifies and stabilizes the voltage signal output by the isolation transformer. The output current limiting and filtering circuit is connected to the dimmer and the output rectification and voltage regulation circuit. The output current limiting and filtering circuit adjusts the output current and output voltage according to the operation of the dimmer, and the output current limiting and filtering circuit limits and filters the signal output by the output rectification and voltage regulation circuit.

19 Claims, 7 Drawing Sheets

LIGHTING APPARATUS

FIELD

The present invention is related to a lighting apparatus, and more particularly related to a lighting apparatus with a flexible setting design.

BACKGROUND

In recent years, LED technology has advanced rapidly, leading to an increasing number of traditional lighting devices being converted to LED-based systems. LEDs offer numerous advantages, including greater energy efficiency, longer lifespan, and enhanced versatility in lighting design and control. These benefits have driven widespread adoption across residential, commercial, and industrial settings.

Traditional lighting devices, such as incandescent and fluorescent lights, often rely on various types of dimmers to control light intensity. These dimmers are typically integrated into wall switches or standalone devices, providing users with a straightforward means of adjusting lighting levels to suit different needs and preferences.

Before the advent of LED technology in lighting design, traditional light devices such as incandescent and fluorescent bulbs were commonly controlled using dimmers. Dimmers are devices that adjust the brightness of a light by varying the voltage waveform applied to the lamp. This functionality allows users to create different lighting atmospheres and conserve energy by reducing the light output when full brightness is not needed.

Incandescent bulbs, which were widely used before LEDs, work well with dimmers due to their simple resistive load characteristics. When the voltage is lowered by a dimmer, the filament in the bulb heats up less, producing less light and consuming less power. This straightforward relationship between voltage and light output made incandescent bulbs ideal for dimming applications. Users could easily control the intensity of light in their homes, offices, and public spaces, providing both aesthetic and practical benefits.

Fluorescent lighting, another prevalent technology before LEDs, posed more challenges for dimming due to its complex electrical characteristics. Traditional fluorescent lamps require a ballast to regulate the current through the tube, and standard dimmers designed for incandescent bulbs were not compatible with these ballasts. However, specialized dimmable ballasts were developed to allow for some level of dimming in fluorescent lighting systems. These solutions were more complex and expensive compared to incandescent dimming, but they provided increased energy savings and extended lamp life by operating at lower power levels.

The use of dimmers with traditional lighting devices also brought about considerations regarding electrical infrastructure. Most dimmers were installed as part of the wall switch, requiring compatibility with existing wiring and electrical codes. This installation process could be straightforward for newer constructions but often required retrofitting in older buildings. Despite these challenges, dimmers became a popular feature in residential and commercial lighting due to their ability to enhance comfort, ambiance, and energy efficiency.

Overall, the use of dimmers with traditional light devices played a significant role in lighting design and energy management before the widespread adoption of LED technology. These devices allowed for adjustable lighting levels, improved energy efficiency, and enhanced user comfort, setting the stage for the more advanced and versatile lighting control systems that would come with the introduction of LED-based lighting solutions.

LED-based lighting systems offer even more flexibility compared to traditional lighting. They can be controlled in a variety of ways, including through smart home systems, remote controls, and programmable settings. This flexibility allows for more personalized and dynamic lighting environments, such as adjusting color temperature, scheduling lighting changes, and integrating with other smart home devices.

However, transitioning from traditional lighting systems to LED-based systems can pose challenges for users, particularly when it comes to modifying existing infrastructure. Replacing wall switches and other control devices to accommodate new LED systems often requires changes to the wiring and electrical layout. This process can be labor-intensive and costly, deterring many users from making the switch despite the potential benefits.

For users who wish to upgrade to LED lighting while maintaining their existing control configurations, the prospect of high installation costs and complex modifications can be a significant barrier. The need to hire electricians and potentially remodel parts of their home or office can lead to substantial expenses and disruptions.

If it were possible to provide more flexible control of LED lighting using traditional dimmers and existing wiring, it would offer significant advantages. Such a solution would allow users to enjoy the benefits of LED technology without the need for extensive and costly modifications to their existing electrical systems.

The key to encouraging widespread adoption of LED lighting lies in developing solutions that integrate seamlessly with traditional control methods. This includes compatibility with existing dimmers and switches, which would minimize installation complexity and costs. By making it easier for users to upgrade to LED lighting, the overall energy efficiency and quality of lighting in various environments can be improved.

However, any new design or technology introduced to bridge the gap between traditional controls and modern LED systems must be cost-effective. If the solution is too expensive or complicated, it may fail to gain traction among users who are already hesitant to invest in significant changes to their lighting infrastructure.

Therefore, the development of user-friendly, cost-effective solutions that allow for the flexible control of LED lighting using traditional configurations is crucial. Such innovations would not only promote the adoption of LED technology but also enhance user experience by preserving the convenience of existing control systems.

SUMMARY

In some embodiments, a lighting apparatus includes an isolation transformer, an output rectification and voltage regulation circuit, an output current limiting and filtering circuit, and a signal detection and generation circuit.

The homonymous terminal of the primary side opposes the homonymous terminal of the secondary side.

The output rectification and voltage regulation circuit is connected to the secondary coil of the isolation transformer.

The output rectification and voltage regulation circuit rectifies and stabilizes the voltage signal output by the isolation transformer.

The output current limiting and filtering circuit is connected to the dimmer and the output rectification and voltage regulation circuit.

The output current limiting and filtering circuit adjusts the output current and output voltage according to the operation of the dimmer, and the output current limiting and filtering circuit limits and filters the signal output by the output rectification and voltage regulation circuit.

The signal detection and generation circuit is connected to the primary coil of the isolation transformer.

The signal detection and generation circuit generates a dimming control signal based on the induced current on the primary coil of the isolation transformer.

In some embodiments, the isolation transformer is a 1:1 signal transmission isolation transformer.

In some embodiments, the output rectification and voltage regulation circuit includes a first diode and a first voltage regulator tube.

The anode of the first diode connects to the first end of the secondary coil of the isolation transformer.

The cathode of the first diode and the cathode of the first voltage regulator tube both connect to the first end of the output current limiting and filtering circuit.

The anode of the first voltage regulator tube connects to the second end of the secondary coil of the isolation transformer and the first common ground terminal.

In some embodiments, the output current limiting and filtering circuit includes a first capacitor, a second capacitor, and a first resistor.

The first ends of the first capacitor, the second capacitor, and the first resistor all connect to form the first end of the output current limiting and filtering circuit and connect to the output rectification and voltage regulation circuit.

The second end of the first resistor forms the second end of the output current limiting and filtering circuit and connects to the positive terminal of the dimmer.

The second ends of the first capacitor and the second capacitor both connect to form the third end of the output current limiting and filtering circuit and connect to the first common ground terminal and the negative terminal of the dimmer.

In some embodiments, the signal detection and generation circuit includes a second resistor and a second diode.

The first end of the second resistor connects to the first end of the primary coil of the isolation transformer.

The second end of the second resistor connects to the anode of the second diode.

The cathode of the second diode serves as the dimming control output end and outputs the dimming control signal.

The second end of the primary coil of the isolation transformer connects to the first power supply end.

In some embodiments, an input rectification and filtering circuit rectifies and filters the input current and then outputs a DC power supply signal.

A TRIAC dimmer interface connects between the input rectification and filtering circuit and the AC interface and is used for connecting to a TRIAC dimmer.

A constant current control circuit connects to the rectification and filtering circuit and the dimming control circuit and receives the DC power supply signal and the dimming control signal and converts the DC power supply signal into a constant current drive signal according to the dimming control signal.

An output rectification and filtering circuit connects to the constant current control circuit and receives the constant current drive signal and rectifies and filters the constant current drive signal.

An anti-flicker circuit connects between the output rectification and filtering circuit and the light source module and eliminates the ripple in the output current of the output rectification and filtering circuit and then outputs to the light source module.

A TRIAC signal detection circuit connects to the input rectification and filtering circuit and the constant current control circuit and detects the output voltage of the input rectification and filtering circuit to obtain the input detection voltage and generates a TRIAC detection signal according to the input detection voltage.

The constant current control circuit determines the access state of the dimmer according to the TRIAC detection signal and adjusts the constant current drive signal according to the access state of the dimmer.

In some embodiments, the driving circuit further includes an input protection circuit.

The input protection circuit connects between the input rectification and filtering circuit and the AC interface and provides overvoltage protection and overcurrent protection of the input current and then outputs to the input rectification and filtering circuit.

In some embodiments, the constant current control circuit includes a constant current drive chip, a third resistor, a fourth resistor, a fifth resistor, a sixth resistor, a seventh resistor, an eighth resistor, a ninth resistor, a tenth resistor, an eleventh resistor, a twelfth resistor, a thirteenth resistor, a fourteenth resistor, a fifteenth resistor, a sixteenth resistor, a seventeenth resistor, an eighteenth resistor, a twentieth resistor, a twenty-first resistor, a twenty-second resistor, a thirty-third resistor, a first switch tube, a third diode, a fourth diode, a fifth diode, a third capacitor, a fourth capacitor, a fifth capacitor, a sixth capacitor, a seventh capacitor, an eighth capacitor, and a first transformer.

The first ends of the third resistor, the fourth resistor, the third capacitor, and the first primary coil of the first transformer all connect to the input rectification and filtering circuit.

The second ends of the third resistor, the fourth resistor, the third capacitor, and the first end of the thirty-third resistor all connect.

The second end of the thirty-third resistor connects to the cathode of the third diode.

The first end of the first switch tube and the anode of the third diode connect to the second end of the primary coil of the first transformer.

The first and second ends of the first secondary coil of the first transformer connect to the output rectification and filtering circuit.

The first end of the second secondary coil of the first transformer and the first end of the fifth resistor form the second power supply end and connect to the first end of the eighteenth resistor.

The second end of the fifth resistor connects to the anode of the fourth diode.

The cathode of the fourth diode, the first end of the fourth capacitor, and the first end of the seventh resistor all connect to the high voltage pin of the constant current drive chip.

The second end of the second secondary coil of the first transformer and the second end of the fourth capacitor connect to ground.

The second end of the seventh resistor connects to the first end of the sixth resistor.

The second end of the sixth resistor forms the third power supply end and connects to the first end of the sixteenth resistor.

The second end of the eighteenth resistor connects to the first end of the nineteenth resistor.

The second end of the nineteenth resistor and the first end of the twenty-first resistor connect to the current zero-crossing detection pin of the constant current drive chip.

The dimming pin of the constant current drive chip connects to the dimming control circuit.

The input pin of the constant current drive chip and the first end of the sixth capacitor connect to the first power supply end.

The compensation pin of the constant current drive chip, the first end of the seventh capacitor, and the first end of the eighth capacitor connect to the TRIAC signal detection circuit.

The second end of the eighth capacitor and the first end of the twenty-second resistor connect to the first end of the twentieth resistor.

The second end of the twentieth resistor, the first end of the fifth capacitor, and the first end of the seventeenth resistor connect.

The second end of the seventeenth resistor connects to the second end of the sixteenth resistor.

The second end of the fifth capacitor, the second end of the twenty-first resistor, the second end of the twenty-first resistor, the second end of the sixth capacitor, the second end of the twenty-second resistor, and the second end of the seventh capacitor connect to ground.

The drive pin of the constant current drive chip connects to the first end of the eighth resistor, the second end of the eighth resistor, the first end of the ninth resistor, and the cathode of the fifth diode connect.

The anode of the fifth diode, the second end of the ninth resistor, and the first end of the eleventh resistor connect to the control end of the first switch tube.

The current sampling pin of the constant current drive chip connects to the first end of the tenth resistor, the second end of the tenth resistor, the second end of the eleventh resistor, the first end of the twelfth resistor, the first end of the thirteenth resistor, the first end of the fourteenth resistor, and the first end of the fifteenth resistor, all connecting to the second end of the first switch tube.

The ground pin of the constant current drive chip, the second end of the twelfth resistor, the second end of the thirteenth resistor, the second end of the fourteenth resistor, and the second end of the fifteenth resistor all connect to ground.

In some embodiments, the output rectification and filtering circuit includes a sixth diode, a twenty-third resistor, a tenth capacitor, an eleventh capacitor, and a twelfth capacitor.

The anode of the sixth diode and the first end of the twenty-third resistor connect to the first end of the second secondary coil of the first transformer.

The second end of the twenty-third resistor connects to the first end of the twelfth capacitor.

The cathode of the sixth diode, the first end of the tenth capacitor, the first end of the eleventh capacitor, and the second end of the twelfth capacitor all connect to the anti-flicker circuit.

The second ends of the tenth capacitor and the eleventh capacitor connect to the second end of the second secondary coil of the first transformer.

In some embodiments, the lighting apparatus may also include a controller.

The controller is coupled to the signal detection and generation circuit.

The controller determines a type of the dimmer.

The controller applies the detected type to determine a corresponding control signal.

In some embodiments, the lighting apparatus may also include a manual switch disposed on an exterior surface of a housing.

The housing encloses the controller.

The manual switch is coupled to the controller for a user to manually disable automatic detection of the type of the dimmer.

The manual switch is used for directly indicating the type of the dimmer.

In some embodiments, when the manual switch directly indicates the type of the dimmer, the controller indicates the output current limiting and filtering circuit to generate the output current according to the indicated type of the dimmer.

In some embodiments, the lighting apparatus may also include a light sensor module.

The light sensor module has a filter to detect light components of different spectrums.

In some embodiments, the lighting apparatus may also include multiple LED modules of different optical parameters.

The controller control driving currents supplied to the multiple LED modules to obtain a required optical parameter of a mixed light of the multiple LED modules.

In some embodiments, the light sensor module detects a first light from of the multiple LED modules.

The light sensor module also detects a second light from ambient environment.

In some embodiments, the light sensor module has a first sensor unit disposed inside a housing that encloses the multiple LED modules.

The light sensor module has a second sensor unit faces to the ambient environment to collect the second light.

In some embodiments, the controller adjusts the mixed light of the multiple LED modules based on the detected first light and the detected second light.

In some embodiments, the controller adjusts a color temperature of the mixed light based on the detected first light and the detected second light.

In some embodiments, the controller adjusts a light intensity of the mixed light based on the detected first light and the detected second light.

In some embodiments, the controller has a filter to delay response variation when a variation of the detected first light and the second light occurs.

DETAILED DESCRIPTION

Figure 1:
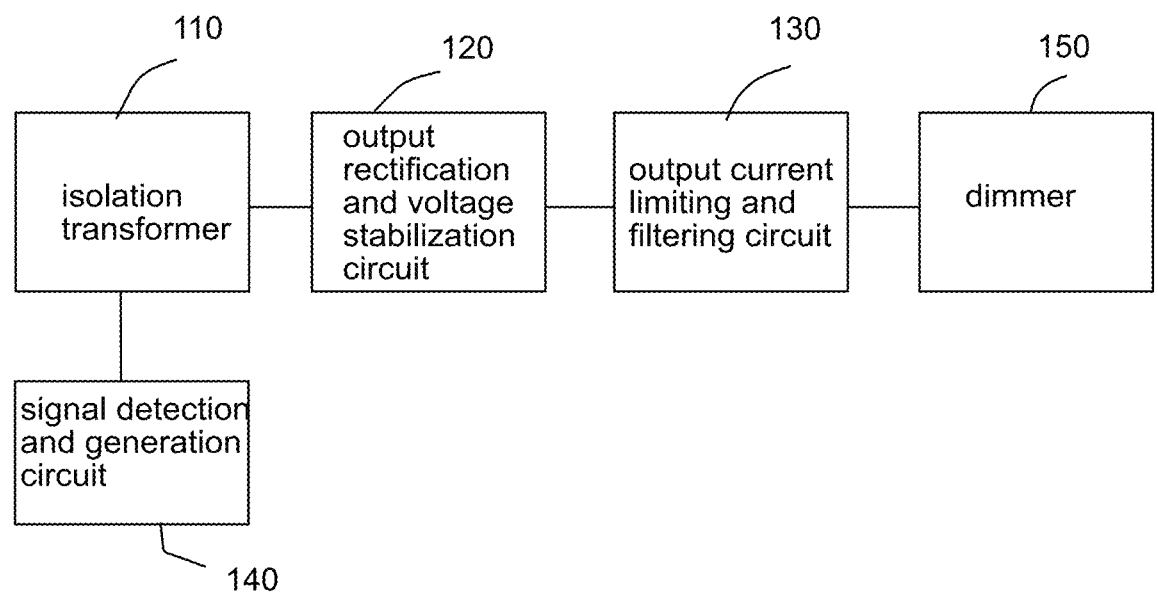
FIG. 1 illustrates a circuit architecture of a first embodiment.

To address the aforementioned technical problems, this application provides an embodiment of a dimming control circuit 100. The dimming control circuit 100 is connected to a dimmer 150 and can generate a dimming control signal based on the operation of the dimmer 150. Referring to FIG. 1, the dimming control circuit 100 in this embodiment includes: an isolation transformer 110, an output rectification and voltage stabilization circuit 120, an output current limiting and filtering circuit 130, and a signal detection and generation circuit 140. Specifically, the primary winding of the isolation transformer 110 has the same name end opposite to the secondary winding. The output rectification and voltage stabilization circuit 120 is connected to the secondary coil of the isolation transformer 110. The output current limiting and filtering circuit 130 is connected to the dimmer 150 and the output rectification and voltage stabilization circuit 120. The signal detection and generation circuit 140 is connected to the primary coil of the isolation transformer 110. The output rectification and voltage stabilization circuit 120 rectifies and stabilizes the voltage signal output by the isolation transformer 110. The output current limiting and filtering circuit 130 adjusts the output current and output voltage according to the operation of the dimmer 150 and performs current limiting and filtering on the signal output by the output rectification and voltage stabilization circuit 120. The signal detection and generation circuit 140 generates a dimming control signal based on the induced current on the primary coil of the isolation transformer 110.

In this embodiment, by setting the same name end of the primary winding of the isolation transformer 110 opposite to the same name end of the secondary winding, and connecting the output rectification and voltage stabilization circuit 120 to the secondary coil of the isolation transformer 110, the output rectification and voltage stabilization circuit 120 performs rectification and voltage stabilization on the voltage signal output by the isolation transformer 110. The output current limiting and filtering circuit 130 adjusts the output current and output voltage according to the operation of the dimmer 150 and performs current limiting and filtering on the signal output by the output rectification and voltage stabilization circuit 120. The signal detection and generation circuit 140 is connected to the primary coil of the isolation transformer 110 and generates a dimming control signal based on the induced current on the primary coil of the isolation transformer 110. This allows the driving circuit to be compatible with various dimmers 150, reducing product specifications, achieving rapid product delivery, lowering inventory, and allowing end-users to match a variety of dimmers 150, thereby improving user experience.

In one embodiment, the isolation transformer 110 is a 1:1 signal transmission isolation transformer 110.

Figure 2:
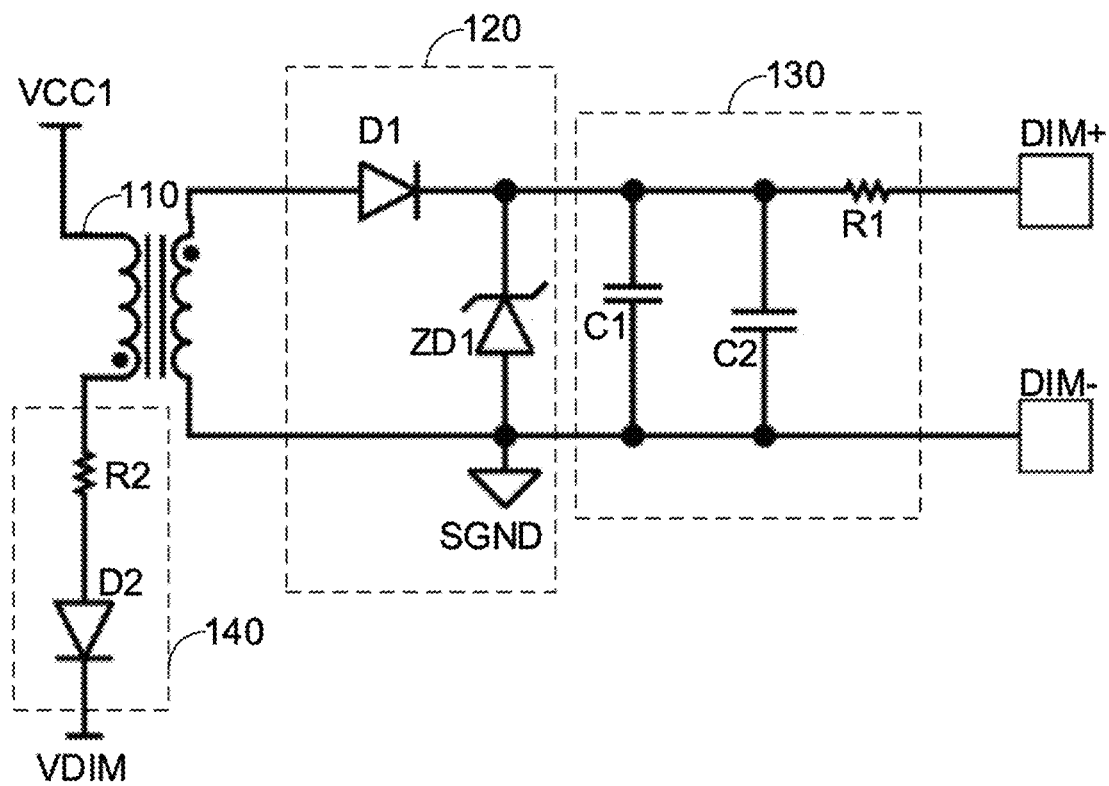
FIG. 2 illustrates a circuit design example for the first embodiment.

In one embodiment, referring to FIG. 2, the output rectification and voltage stabilization circuit 120 includes a first diode D1 and a first zener diode ZD1. The anode of the first diode D1 is connected to the first end of the secondary coil of the isolation transformer 110. The cathode of the first diode D1 and the cathode of the first zener diode ZD1 are jointly connected to the first end of the output current limiting and filtering circuit 130. The anode of the first zener diode ZD1 and the second end of the secondary coil of the isolation transformer 110 are jointly connected to the first common ground end.

In one embodiment, referring to FIG. 2, the output current limiting and filtering circuit 130 includes a first capacitor C1, a second capacitor C2, and a first resistor R1. The first end of the first capacitor C1, the first end of the second capacitor C2, and the first end of the first resistor R1 are jointly connected to form the first end of the output current limiting and filtering circuit 130, which is connected to the output rectification and voltage stabilization circuit 120. The second end of the first resistor R1 forms the second end of the output current limiting and filtering circuit 130 and is connected to the positive terminal of the dimmer 150. The second end of the first capacitor C1 and the second end of the second capacitor C2 are jointly connected to form the third end of the output current limiting and filtering circuit 130, which is connected to the first common ground end and the negative terminal of the dimmer 150.

In one embodiment, referring to FIG. 2, the signal detection and generation circuit 140 includes a second resistor R2 and a second diode D2. The first end of the second resistor R2 is connected to the first end of the primary coil of the isolation transformer 110. The second end of the second resistor R2 is connected to the anode of the second diode D2. The cathode of the second diode D2 serves as the dimming control output terminal for outputting the dimming control signal. The second end of the primary coil of the isolation transformer 110 is connected to the first power supply terminal VCC1.

In this embodiment, the dimming control circuit 100 consists of the isolation transformer 110, the output rectification and voltage stabilization circuit 120, the output current limiting and filtering circuit 130, and the signal detection and generation circuit 140. Specifically, the dimming control circuit 100 is connected to a constant current control circuit 300 in applications to provide a dimming control signal to the constant current control circuit 300. The following describes the working principle in combination with FIG. 2.

The positive and negative terminals of the dimmer 150 can be used for the dimmer 150. In some embodiments, the positive and negative terminals of the dimmer 150 can connect to any of a 0-10V dimmer 150, a PWM dimmer 150, or a resistive dimmer 150.

When the dimming control circuit 100 operates, a PWM signal is first generated inside the constant current driving chip U1 of the constant current control circuit 300. The PWM signal is then transmitted through a 1:1 signal transmission transformer (i.e., the isolation transformer 110) and the output rectification and voltage stabilization circuit 120 to achieve a 10V voltage output, thereby achieving maximum brightness output. When the output current limiting and filtering circuit 130 connects to the dimmer 150 to reduce the output voltage, the voltage reflected by the constant current control circuit 300 through the 1:1 signal transformer decreases, thereby reducing the PWM duty cycle of the dimming control pin DIM of the constant current driving chip U1. The constant current driving chip U1 detects the reduced duty cycle time and automatically lowers the output current, thereby achieving brightness adjustment.

Figure 3:
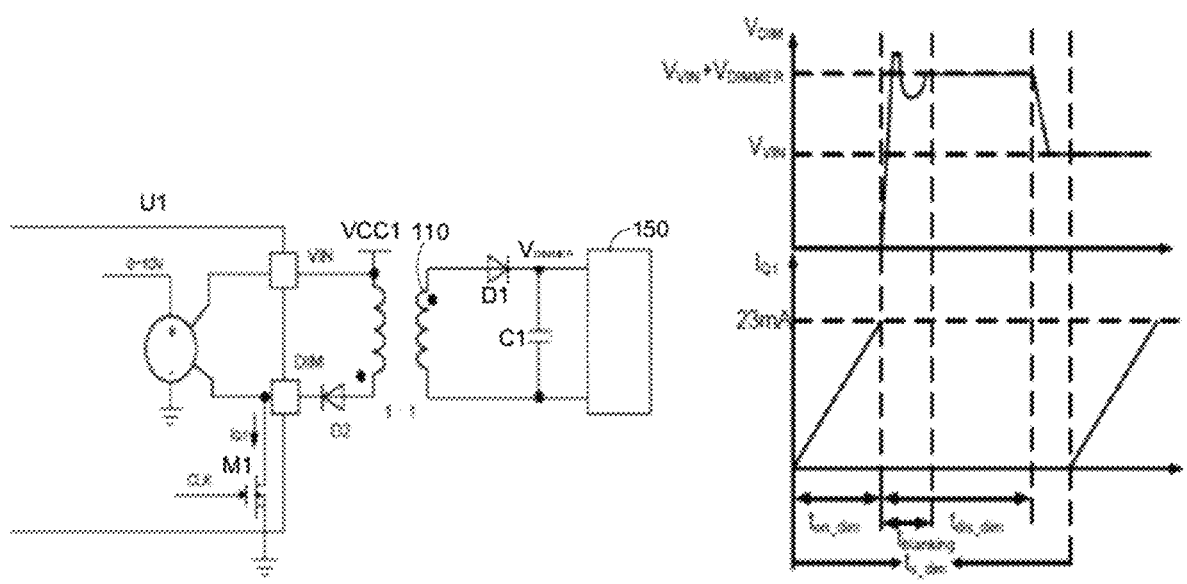
FIG. 3 illustrates circuit and signal wave form diagram.

The detailed working principle will be described below with reference to the internal block diagram of the constant current driving chip U1 and a simplified dimming control circuit 100 (as shown in FIG. 3).

In one embodiment, referring to FIG. 2, the signal detection and generation circuit 140 includes a second resistor R2 and a second diode D2. The first end of the second resistor R2 is connected to the first end of the primary coil of the isolation transformer 110. The second end of the second resistor R2 is connected to the anode of the second diode D2. The cathode of the second diode D2 serves as the dimming control output terminal for outputting the dimming control signal. The second end of the primary coil of the isolation transformer 110 is connected to the first power supply terminal VCC1.

In this embodiment, the dimming control circuit 100 consists of the isolation transformer 110, the output rectification and voltage stabilization circuit 120, the output current limiting and filtering circuit 130, and the signal detection and generation circuit 140. Specifically, the dimming control circuit 100 is connected to a constant current control circuit 300 in applications to provide a dimming control signal to the constant current control circuit 300. The following describes the working principle in combination with FIG. 2.

The positive and negative terminals of the dimmer 150 can be used for the dimmer 150. In some embodiments, the positive and negative terminals of the dimmer 150 can connect to any of a 0-10V dimmer 150, a PWM dimmer 150, or a resistive dimmer 150.

When the dimming control circuit 100 operates, a PWM signal is first generated inside the constant current driving chip U1 of the constant current control circuit 300. The PWM signal is then transmitted through a 1:1 signal transmission transformer (i.e., the isolation transformer 110) and the output rectification and voltage stabilization circuit 120 to achieve a 10V voltage output, thereby achieving maximum brightness output. When the output current limiting and filtering circuit 130 connects to the dimmer 150 to reduce the output voltage, the voltage reflected by the constant current control circuit 300 through the 1:1 signal transformer decreases, thereby reducing the PWM duty cycle of the dimming control pin DIM of the constant current driving chip U1. The constant current driving chip U1 detects the reduced duty cycle time and automatically lowers the output current, thereby achieving brightness adjustment.

The detailed working principle will be described below with reference to the internal block diagram of the constant current driving chip U1 and a simplified dimming control circuit 100 (as shown in FIG. 3).

When the internal MOS transistor (M1) of the dimming control pin of the constant current driving chip U1 is turned on, the primary coil (i.e., primary inductance) of the isolation transformer 110 stores energy. When IM1=23 mA, M1 turns off, at which point the first diode D1 conducts, and the inductor releases energy to the dimmer 150. The constant current driving chip U1 then performs differential sampling of the VIN and DIM signals. The dimming control signal sampled inside the constant current driving chip U1 is: VDIM−VVIN=VDIMMER+ (VD1−VD2). Due to the minimum Toff limit for the DIM sampling of the constant current driving chip U1, Toff_min>1.5 uS. In some embodiments, Toff_min can be designed as 2 uS.

In some embodiments, the isolation transformer 110 can be an EE-type transformer, which has stable initial permeability under high and low temperatures, and the inductance value does not vary significantly under these conditions.

The inductance Lm≥((VDIMMER+Vf)*2 us*1.5)/23 mA, where 23 mA is the primary excitation current of the isolation transformer 110, Vf is the voltage drop of the output diode (the first diode D1), and VDIMMER is the voltage stabilization value of the output Zener diode (the first Zener diode ZD1). In some embodiments, it can be set to 10V. Through this calculation, the inductance Lm can be obtained as 1.3-2 mH.

Figure 4:
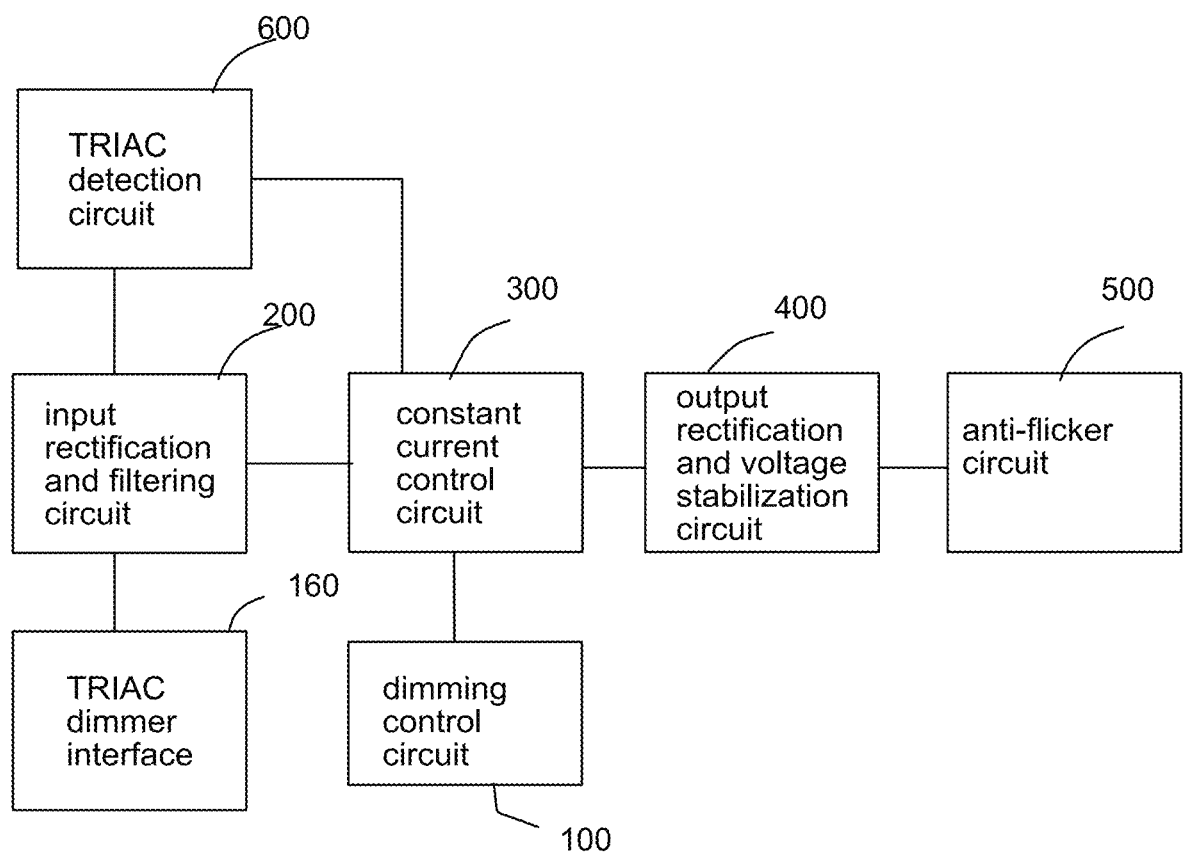
FIG. 4 illustrates another circuit architecture diagram.

This application also provides a driving circuit. The driving circuit connects to the light source module. Referring to FIG. 4, the driving circuit includes the dimming control circuit 100, the input rectification and filtering circuit 200, the thyristor dimmer interface 160, the constant current control circuit 300, the output rectification and filtering circuit 400, the anti-flicker circuit 500, and the thyristor signal detection circuit 600.

In this embodiment, the dimming control circuit 100 can be any of the dimming control circuits 100 in the above embodiments. The input rectification and filtering circuit 200 is used to rectify and filter the input current and output a DC power supply signal. The thyristor dimmer interface 160 is connected between the input rectification and filtering circuit 200 and the AC interface and is used for connecting the thyristor dimmer 150. The constant current control circuit 300 is connected to the rectification and filtering circuit and the dimming control circuit 100. The constant current control circuit 300 receives the DC power supply signal and the dimming control signal and converts the DC power supply signal into a constant current driving signal according to the dimming control signal. The output rectification and filtering circuit 400 is connected to the constant current control circuit and is used to receive the constant current driving signal and rectify and filter the constant current driving signal. The anti-flicker circuit 500 is connected between the output rectification and filtering circuit 400 and the light source module and is used to eliminate ripples in the output current of the output rectification and filtering circuit 400 and then output it to the light source module. The thyristor signal detection circuit 600 is connected to the input rectification and filtering circuit 200 and the constant current control circuit 300 and is used to detect the output voltage of the input rectification and filtering circuit 200 to obtain an input detection voltage and generate a thyristor detection signal according to the input detection voltage. The constant current control circuit 300 is further used to determine the access state of the dimmer 150 according to the thyristor detection signal and adjust the constant current driving signal according to the access state of the dimmer 150.

In this embodiment, the input end of the input rectification and filtering circuit 200 can be used to connect to AC power and can also connect to the thyristor dimmer 150 through the thyristor dimmer interface 160. The thyristor signal detection circuit 600 detects the output voltage of the input rectification and filtering circuit 200 to determine whether the thyristor dimmer interface 160 is connected to the thyristor dimmer 150, thereby achieving the purpose of detecting the type of thyristor connected in the driving circuit. For example, when the thyristor dimmer interface 160 is not connected to the TRIAC dimmer 150, the constant current control circuit 300 samples the current peak value at each switch cycle conduction time and compares it with the internal threshold voltage at the off time to obtain the compensation voltage, thereby controlling the conduction time of its switch tube to achieve constant current output. When the thyristor dimmer interface 160 is connected to the TRIAC dimmer 150, if the conduction angle of the TRIAC dimmer 150 is large, the compensation voltage VCOMP<the maximum compensation voltage VCOMP_max, the conduction time Ton<the maximum conduction time Ton_Max, and the system maintains constant current output. As the conduction angle of the TRIAC dimmer 150 gradually decreases, making the compensation voltage VCOMP≥the maximum compensation voltage VCOMP_max, the conduction time Ton is constant at the maximum conduction time Ton_Max. As the conduction angle decreases, the output current starts to decrease, thereby achieving the purpose of dimming.

In this embodiment, the input rectification and filtering circuit 200's input end can be used to connect to AC power and can also connect to the thyristor dimmer 150 through the thyristor dimmer interface 160. The thyristor signal detection circuit 600 detects the output voltage of the input rectification and filtering circuit 200 to determine whether the thyristor dimmer interface 160 is connected to the thyristor dimmer 150, thereby achieving the purpose of detecting the type of thyristor connected in the driving circuit. For example, when the thyristor dimmer interface 160 is not connected to the TRIAC dimmer 150, the constant current control circuit 300 samples the current peak value at each switch cycle conduction time and compares it with the internal threshold voltage at the off time to obtain the compensation voltage, thereby controlling the conduction time of its switch tube to achieve constant current output. When the thyristor dimmer interface 160 is connected to the TRIAC dimmer 150, if the conduction angle of the TRIAC dimmer 150 is large, the compensation voltage VCOMP is less than the maximum compensation voltage VCOMP_max, the conduction time Ton is less than the maximum conduction time Ton_Max, and the system maintains constant current output. As the conduction angle of the TRIAC dimmer 150 gradually decreases, making the compensation voltage VCOMP greater than or equal to the maximum compensation voltage VCOMP_max, the conduction time Ton remains constant at the maximum conduction time Ton_Max. As the conduction angle decreases, the output current starts to decrease, thereby achieving the purpose of dimming.

Figure 5:
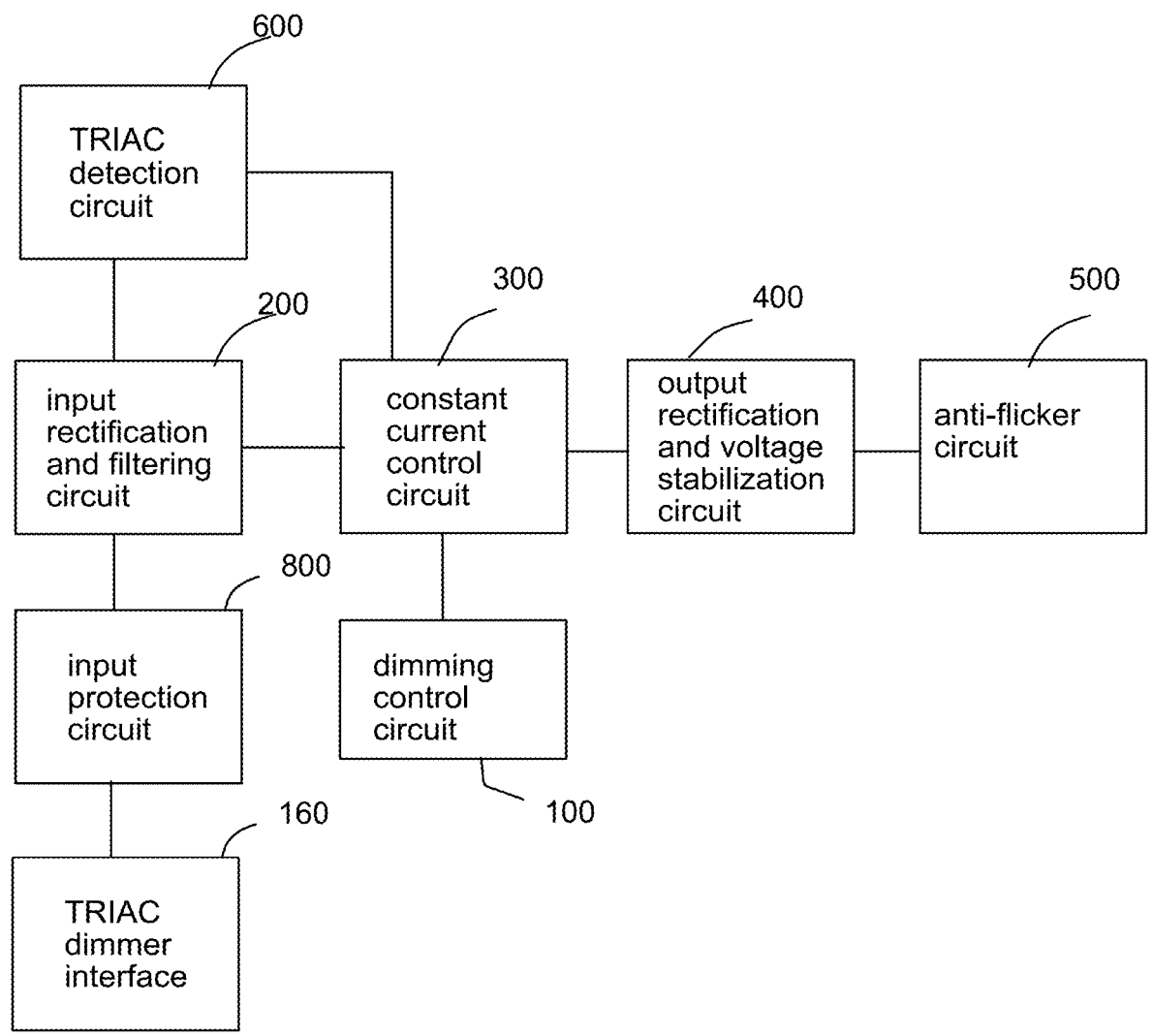
FIG. 5 illustrates another circuit architecture diagram.

In one embodiment, referring to FIG. 5, the driving circuit also includes an input protection circuit 800. The input protection circuit 800 is connected between the input rectification and filtering circuit 200 and the AC interface. The input protection circuit 800 is used to provide overvoltage protection and overcurrent protection to the input current before it is output to the input rectification and filtering circuit 200.

In this embodiment, the AC interface is used to connect to AC power. The AC interface includes a live wire end and a neutral wire end. By setting the input protection circuit 800 between the input rectification and filtering circuit 200 and the AC interface, it is possible to prevent the voltage or current of the AC power from being too high and causing damage to components in downstream circuits such as the rectification and filtering circuit.

Figure 6:
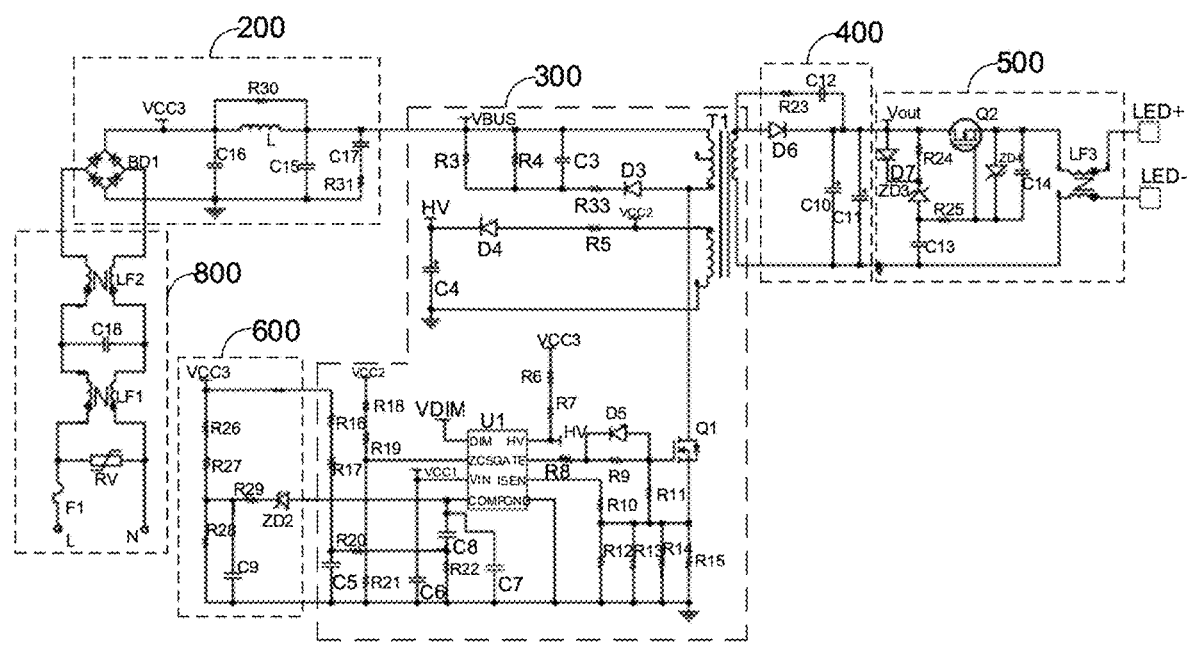
FIG. 6 illustrates a circuit example to implement the embodiment.

In one embodiment, referring to FIG. 6, the constant current control circuit 300 includes: a constant current drive chip U1, third resistor R3, fourth resistor R4, fifth resistor R5, sixth resistor R6, seventh resistor R7, eighth resistor R8, ninth resistor R9, tenth resistor R10, eleventh resistor R11, twelfth resistor R12, thirteenth resistor R13, fourteenth resistor R14, fifteenth resistor R15, sixteenth resistor R16, seventeenth resistor R17, eighteenth resistor R18, twentieth resistor R20, twenty-first resistor R21, twenty-second resistor R22, thirty-third resistor R33, first switch Q1, third diode D3, fourth diode D4, fifth diode D5, third capacitor C3, fourth capacitor C4, fifth capacitor C5, sixth capacitor C6, seventh capacitor C7, eighth capacitor C8, and first transformer T1.

The first ends of the third resistor R3, fourth resistor R4, and third capacitor C3, and the primary coil of the first transformer T1 are all connected to the input rectification and filtering circuit 200. The second ends of the third resistor R3, fourth resistor R4, and third capacitor C3, and the first end of the thirty-third resistor R33 are all connected. The second end of the thirty-third resistor R33 is connected to the cathode of the third diode D3. The first end of the first switch Q1 and the anode of the third diode D3 are connected to the second end of the primary coil of the first transformer T1. The first and second ends of the first secondary coil of the first transformer T1 are connected to the output rectification and filtering circuit 400.

The first end of the second secondary coil of the first transformer T1 and the first end of the fifth resistor R5 are connected to form the second power supply terminal VCC2 and are connected to the first end of the eighteenth resistor R18. The second end of the fifth resistor R5 is connected to the anode of the fourth diode D4. The cathode of the fourth diode D4, the first end of the fourth capacitor C4, and the first end of the seventh resistor R7 are all connected to the high voltage pin HV of the constant current drive chip U1. The second end of the second secondary coil of the first transformer T1 and the second end of the fourth capacitor C4 are grounded.

The second end of the seventh resistor R7 is connected to the first end of the sixth resistor R6. The second end of the sixth resistor R6 is the third power supply terminal VCC3 and is connected to the first end of the sixteenth resistor R16. The second end of the eighteenth resistor R18 is connected to the first end of the nineteenth resistor R19. The second end of the nineteenth resistor R19 and the first end of the twenty-first resistor R21 are all connected to the current zero-crossing detection pin ZCS of the constant current drive chip U1. The dimming pin DIM of the constant current drive chip U1 is connected to the dimming control circuit 100. The input pin VIN of the constant current drive chip U1 and the first end of the sixth capacitor C6 are connected to the first power supply terminal VCC1. The compensation pin COMP of the constant current drive chip U1, the first end of the seventh capacitor C7, and the first end of the eighth capacitor C8 are all connected to the thyristor signal detection circuit 600. The second end of the eighth capacitor C8 and the first end of the twenty-second resistor R22 are all connected to the first end of the twentieth resistor R20. The second end of the twentieth resistor R20, the first end of the fifth capacitor C5, and the first end of the seventeenth resistor R17 are all connected. The second end of the seventeenth resistor R17 is connected to the second end of the sixteenth resistor R16. The second end of the fifth capacitor C5, the second end of the twenty-first resistor R21, the second end of the twenty-first resistor R21, the second end of the sixth capacitor C6, the second end of the twenty-second resistor R22, and the second end of the seventh capacitor C7 are all grounded. The drive pin GATE of the constant current drive chip U1 is connected to the first end of the eighth resistor R8. The second end of the eighth resistor R8, the first end of the ninth resistor R9, and the cathode of the fifth diode D5 are all connected. The anode of the fifth diode D5, the second end of the ninth resistor R9, and the first end of the eleventh resistor R11 are all connected to the control end of the first switch Q1. The current sampling pin of the constant current drive chip U1 is connected to the first end of the tenth resistor R10. The second end of the tenth resistor R10, the second end of the eleventh resistor R11, the first end of the twelfth resistor R12, the first end of the thirteenth resistor R13, the first end of the fourteenth resistor R14, and the first end of the fifteenth resistor R15 are all connected to the second end of the first switch Q1. The grounding pin GND of the constant current drive chip U1, the second end of the twelfth resistor R12, the second end of the thirteenth resistor R13, the second end of the fourteenth resistor R14, and the second end of the fifteenth resistor R15 are all grounded.

In this embodiment, the constant current control circuit 300 is composed of a constant current drive chip U1, a high-voltage startup circuit (composed of the sixth resistor R6, seventh resistor R7, and fourth capacitor C4), an auxiliary winding power supply circuit (composed of the fifth resistor R5, fourth diode D4, and fourth capacitor C4), an RCD snubber circuit (composed of the third resistor R3, fourth resistor R4, third capacitor C3, third diode D3, and thirty-third resistor R33), an output overvoltage protection and QR working mode detection circuit (composed of the eighteenth resistor R18, nineteenth resistor R19, and twentieth resistor R20), a COMP compensation and RC circuit (composed of the sixteenth resistor R16, seventeenth resistor R17, twentieth resistor R20, fifth capacitor C5, eighth capacitor C8, twenty-second resistor R22, sixth capacitor C6, and seventh capacitor C7), and an MOS drive and constant current control circuit 300 (composed of the first transformer T1, eighth resistor R8, ninth resistor R9, fifth diode D5, first switch Q1, tenth resistor R10, eleventh resistor R11, twelfth resistor R12, thirteenth resistor R13, fourteenth resistor R14, and fifteenth resistor R15). The high-voltage startup circuit accelerates the startup time of the circuit to ensure quick startup of the power supply even at low conduction angles. The auxiliary winding power supply circuit replaces the high-voltage supply after the constant current drive chip U1 starts, providing working current for the internal logic unit and MOS drive circuit. The RCD snubber circuit absorbs energy generated by the transformer's leakage inductance, protecting the MOS from breakdown. The COMP compensation circuit improves the power factor (PF) and total harmonic distortion (THD) at high voltage input. The output overvoltage protection and QR working mode detection circuit performs voltage division detection on the auxiliary winding's voltage and uses a reasonable resistor setting through the turns ratio calculation to achieve output voltage control. When the current sampling pin of the constant current drive chip U1 detects a zero-crossing signal and performs delayed conduction, QR quasi-resonant operation is achieved, improving power supply efficiency.

The constant current drive chip U1 features both a compensation pin COMP and a dimming control pin DIM. The compensation pin COMP detects the TRIAC dimming signal and controls brightness based on the conduction angle of the TRIAC dimmer 150. The dimming control pin DIM controls the lamp's brightness based on the PWM signal's duty cycle.

In one specific embodiment, the constant current control circuit 300 in this example can be configured as a Flyback or Buck-boost topology, with the constant current drive chip U1 employing single-stage primary side control and closed-loop constant current control.

In one embodiment, as shown in FIG. 6, the output rectification and filtering circuit 400 includes: a sixth diode D6, a twenty-third resistor R23, a tenth capacitor C10, an eleventh capacitor C11, and a twelfth capacitor C12. The anode of the sixth diode D6 and the first end of the twenty-third resistor R23 are connected to the first end of the secondary coil of the first transformer T1, the second end of the twenty-third resistor R23 is connected to the first end of the twelfth capacitor C12, and the cathode of the sixth diode D6, the first end of the tenth capacitor C10, the first end of the eleventh capacitor C11, and the second end of the twelfth capacitor C12 are connected to the anti-flicker circuit 500. The second end of the tenth capacitor C10 and the second end of the eleventh capacitor C11 are connected to the second end of the secondary coil of the first transformer T1.

In this embodiment, the output rectification and filtering circuit 400 consists of the sixth diode D6, the twenty-third resistor R23, the tenth capacitor C10, the eleventh capacitor C11, and the twelfth capacitor C12. The sixth diode D6 performs rectification on the current output by the first transformer T1. The tenth capacitor C10, eleventh capacitor C11, and twelfth capacitor C12 perform filtering on the current that flows through them, thus rectifying and filtering the energy transferred from the primary side of the first transformer T1 before outputting it.

In one embodiment, as shown in FIG. 6, the anti-flicker circuit 500 includes a second switch transistor Q2, a seventh diode D7, a third voltage regulator ZD3, a fourth voltage regulator ZD4, a twenty-fourth resistor R24, a twenty-fifth resistor R25, a thirteenth capacitor C13, a fourteenth capacitor C14, and a third common mode inductor LF3. The anode of the seventh diode D7, the first end of the twenty-fourth resistor R24, and the first end of the second switch transistor Q2 are all connected to the output rectification and filtering circuit 400. The cathode of the seventh diode D7, the second end of the twenty-fourth resistor R24, and the cathode of the third voltage regulator ZD3 are connected together. The anode of the third voltage regulator ZD3, the first end of the twenty-fifth resistor R25, and the first end of the thirteenth capacitor C13 are connected together. The second end of the twenty-fifth resistor R25, the control end of the second switch transistor Q2, the cathode of the fourth voltage regulator ZD4, and the second end of the fourteenth capacitor C14 are connected together. The second end of the second switch transistor Q2, the anode of the fourth voltage regulator ZD4, and the second end of the fourteenth capacitor C14 are connected to the first end of the third common mode inductor LF3. The second end of the third common mode inductor LF3 and the second end of the thirteenth capacitor C13 are connected to ground. The third end of the third common mode inductor LF3 is connected to the positive terminal of the load LED+, and the fourth end of the third common mode inductor LF3 is connected to the negative terminal of the load LED−.

In this embodiment, the anti-flicker circuit 500, composed of the second switch transistor Q2, the seventh diode D7, the third voltage regulator ZD3, the fourth voltage regulator ZD4, the twenty-fourth resistor R24, the twenty-fifth resistor R25, the thirteenth capacitor C13, the fourteenth capacitor C14, and the third common mode inductor LF3, can reduce the ripple of the output current, achieving low flicker output while also eliminating the shimmer effect at low-end dimming.

In one embodiment, as shown in FIG. 6, the input rectification and filtering circuit 200 includes a rectifier bridge BD1, a sixteenth capacitor C16, a fifteenth capacitor C15, a first inductor L, a thirtieth resistor R30, a seventeenth capacitor C17, and a thirty-first resistor R31. The first input end of the rectifier bridge BD1 is connected to the live wire end L, and the second input end of the rectifier bridge BD1 is connected to the neutral wire end N. The first output end of the rectifier bridge BD1, the first end of the sixteenth capacitor C16, the first end of the first inductor L, and the first end of the thirtieth resistor R30 are all connected to the third power supply end VCC3. The second end of the thirtieth resistor R30, the second end of the first inductor L, the first end of the fifteenth capacitor C15, and the first end of the seventeenth capacitor C17 are connected to the constant current drive circuit. The second end of the seventeenth capacitor C17 is connected to the first end of the thirty-first resistor R31. The second end of the thirty-first resistor R31, the second end of the fifteenth capacitor C15, the second end of the sixteenth capacitor C16, and the second output end of the rectifier bridge BD1 are connected to ground.

In this embodiment, the rectifier bridge BD1 is used to rectify the input current. The filtering circuit is composed of the sixteenth capacitor C16, the fifteenth capacitor C15, the first inductor L, the thirtieth resistor R30, the seventeenth capacitor C17, and the thirty-first resistor R31. This filtering circuit processes the rectified DC current to eliminate ripples and avoid surge current output to subsequent circuits.

In one embodiment, as shown in FIG. 6, the input protection circuit 800 includes a first common mode inductor LF1, a second common mode inductor LF2, a first fuse F1, a varistor RV, and an eighteenth capacitor C18. The first end of the first fuse F1 is connected to the live wire end L. The second end of the first fuse F1, the first end of the varistor RV, and the first end of the first common mode inductor LF1 are connected together. The second end of the varistor RV and the second end of the first common mode inductor LF1 are connected to the neutral wire end N. The third end of the first common mode inductor LF1 and the first end of the second common mode inductor LF2 are connected to the first end of the eighteenth capacitor C18. The fourth end of the first common mode inductor LF1 and the second end of the second common mode inductor LF2 are connected to the second end of the eighteenth capacitor C18. The third end of the second common mode inductor LF2 is connected to the first input end of the input rectification and filtering circuit 200. The fourth end of the second common mode inductor LF2 is connected to the second input end of the input rectification and filtering circuit 200.

In this embodiment, the first fuse F1 provides overcurrent protection for the input AC current, and the varistor RV provides overvoltage protection for the input AC current, preventing excessive current and voltage from damaging downstream components.

In one embodiment, as shown in FIG. 6, the TRIAC signal detection circuit 600 includes a second voltage regulator ZD2, a twenty-sixth resistor R26, a twenty-seventh resistor R27, a twenty-eighth resistor R28, a twenty-ninth resistor R29, and a ninth capacitor C9. The anode of the second voltage regulator ZD2 is connected to the constant current control circuit 300, and the cathode of the second voltage regulator ZD2 is connected to the first end of the twenty-ninth resistor R29. The second end of the twenty-ninth resistor R29, the first end of the twenty-eighth resistor R28, the first end of the ninth capacitor C9, and the first end of the twenty-seventh resistor R27 are connected together. The second end of the twenty-seventh resistor R27 is connected to the first end of the twenty-sixth resistor R26. The second end of the twenty-sixth resistor R26 is connected to the third power supply end VCC3. The second end of the twenty-eighth resistor R28 and the second end of the ninth capacitor C9 are connected to ground.

In this embodiment, the TRIAC signal detection circuit 600, composed of the second voltage regulator ZD2, the twenty-sixth resistor R26, the twenty-seventh resistor R27, the twenty-eighth resistor R28, the twenty-ninth resistor R29, and the ninth capacitor C9, divides the bus voltage through the twenty-sixth resistor R26, the twenty-seventh resistor R27, and the twenty-eighth resistor R28. The voltage is then stabilized and limited by the twenty-ninth resistor R29 and the ninth capacitor C9 before being connected to the compensation pin COMP of the constant current drive chip U1. The compensation pin COMP can detect whether a TRIAC dimmer 150 is connected to the circuit.

In one embodiment, this application also provides a lamp, including: a light source module; and a driving circuit as described in any of the embodiments above.

In this embodiment, the driving circuit is connected to the light source module. By adding only a small double-winding transformer and some electronic components to the traditional TRIAC dimming circuit to form a new dimming control circuit, and applying this dimming control circuit to the driving circuit to drive the light source module, it can be compatible with TRIAC dimmers, 0-10V dimmers, PWM dimmers, and variable resistor dimmers.

This application proposes a dimming control circuit and a driving circuit that can be compatible with multiple types of dimmers with a simple circuit structure and low cost. Its circuit structure is simple, highly reliable, can reduce product specifications, achieve rapid delivery, lower customer inventory, and allow end-users to match various dimmers, facilitating rapid market capture.

The beneficial effects of this application: by setting the primary and secondary sides of the isolation transformer to be opposite, and connecting the output rectification and voltage stabilization circuit to the secondary coil of the isolation transformer, the output rectification and voltage stabilization circuit processes the voltage signal output by the isolation transformer. The output current limiting and filtering circuit adjusts the output current and voltage according to the operation of the dimmer and limits and filters the signal output by the output rectification and voltage stabilization circuit. The signal detection and generation circuit is connected to the primary coil of the isolation transformer and generates a dimming control signal based on the induced current in the primary coil of the isolation transformer. This allows the driving circuit to be compatible with multiple dimmers, reducing product specifications, achieving rapid delivery, lowering inventory, and allowing end-users to match various dimmers, thereby improving user experience.

In some embodiments, a lighting apparatus includes an isolation transformer, an output rectification and voltage regulation circuit, an output current limiting and filtering circuit, and a signal detection and generation circuit.

The homonymous terminal of the primary side opposes the homonymous terminal of the secondary side.

The output rectification and voltage regulation circuit is connected to the secondary coil of the isolation transformer.

The output rectification and voltage regulation circuit rectifies and stabilizes the voltage signal output by the isolation transformer.

The output current limiting and filtering circuit is connected to the dimmer and the output rectification and voltage regulation circuit.

The output current limiting and filtering circuit adjusts the output current and output voltage according to the operation of the dimmer, and the output current limiting and filtering circuit limits and filters the signal output by the output rectification and voltage regulation circuit.

The signal detection and generation circuit is connected to the primary coil of the isolation transformer.

The signal detection and generation circuit generates a dimming control signal based on the induced current on the primary coil of the isolation transformer.

In some embodiments, the isolation transformer is a 1:1 signal transmission isolation transformer.

In some embodiments, the output rectification and voltage regulation circuit includes a first diode and a first voltage regulator tube.

The anode of the first diode connects to the first end of the secondary coil of the isolation transformer.

The cathode of the first diode and the cathode of the first voltage regulator tube both connect to the first end of the output current limiting and filtering circuit.

The anode of the first voltage regulator tube connects to the second end of the secondary coil of the isolation transformer and the first common ground terminal.

In some embodiments, the output current limiting and filtering circuit includes a first capacitor, a second capacitor, and a first resistor.

The first ends of the first capacitor, the second capacitor, and the first resistor all connect to form the first end of the output current limiting and filtering circuit and connect to the output rectification and voltage regulation circuit.

The second end of the first resistor forms the second end of the output current limiting and filtering circuit and connects to the positive terminal of the dimmer.

The second ends of the first capacitor and the second capacitor both connect to form the third end of the output current limiting and filtering circuit and connect to the first common ground terminal and the negative terminal of the dimmer.

In some embodiments, the signal detection and generation circuit includes a second resistor and a second diode.

The first end of the second resistor connects to the first end of the primary coil of the isolation transformer.

The second end of the second resistor connects to the anode of the second diode.

The cathode of the second diode serves as the dimming control output end and outputs the dimming control signal.

The second end of the primary coil of the isolation transformer connects to the first power supply end.

In some embodiments, an input rectification and filtering circuit rectifies and filters the input current and then outputs a DC power supply signal.

A TRIAC dimmer interface connects between the input rectification and filtering circuit and the AC interface and is used for connecting to a TRIAC dimmer.

A constant current control circuit connects to the rectification and filtering circuit and the dimming control circuit and receives the DC power supply signal and the dimming control signal and converts the DC power supply signal into a constant current drive signal according to the dimming control signal.

An output rectification and filtering circuit connects to the constant current control circuit and receives the constant current drive signal and rectifies and filters the constant current drive signal.

An anti-flicker circuit connects between the output rectification and filtering circuit and the light source module and eliminates the ripple in the output current of the output rectification and filtering circuit and then outputs to the light source module.

A TRIAC signal detection circuit connects to the input rectification and filtering circuit and the constant current control circuit and detects the output voltage of the input rectification and filtering circuit to obtain the input detection voltage and generates a TRIAC detection signal according to the input detection voltage.

The constant current control circuit determines the access state of the dimmer according to the TRIAC detection signal and adjusts the constant current drive signal according to the access state of the dimmer.

In some embodiments, the driving circuit further includes an input protection circuit.

The input protection circuit connects between the input rectification and filtering circuit and the AC interface and provides overvoltage protection and overcurrent protection of the input current and then outputs to the input rectification and filtering circuit.

In some embodiments, the constant current control circuit includes a constant current drive chip, a third resistor, a fourth resistor, a fifth resistor, a sixth resistor, a seventh resistor, an eighth resistor, a ninth resistor, a tenth resistor, an eleventh resistor, a twelfth resistor, a thirteenth resistor, a fourteenth resistor, a fifteenth resistor, a sixteenth resistor, a seventeenth resistor, an eighteenth resistor, a twentieth resistor, a twenty-first resistor, a twenty-second resistor, a thirty-third resistor, a first switch tube, a third diode, a fourth diode, a fifth diode, a third capacitor, a fourth capacitor, a fifth capacitor, a sixth capacitor, a seventh capacitor, an eighth capacitor, and a first transformer.

The first ends of the third resistor, the fourth resistor, the third capacitor, and the first primary coil of the first transformer all connect to the input rectification and filtering circuit.

The second ends of the third resistor, the fourth resistor, the third capacitor, and the first end of the thirty-third resistor all connect.

The second end of the thirty-third resistor connects to the cathode of the third diode.

The first end of the first switch tube and the anode of the third diode connect to the second end of the primary coil of the first transformer.

The first and second ends of the first secondary coil of the first transformer connect to the output rectification and filtering circuit.

The first end of the second secondary coil of the first transformer and the first end of the fifth resistor form the second power supply end and connect to the first end of the eighteenth resistor.

The second end of the fifth resistor connects to the anode of the fourth diode.

The cathode of the fourth diode, the first end of the fourth capacitor, and the first end of the seventh resistor all connect to the high voltage pin of the constant current drive chip.

The second end of the second secondary coil of the first transformer and the second end of the fourth capacitor connect to ground.

The second end of the seventh resistor connects to the first end of the sixth resistor.

The second end of the sixth resistor forms the third power supply end and connects to the first end of the sixteenth resistor.

The second end of the eighteenth resistor connects to the first end of the nineteenth resistor.

The second end of the nineteenth resistor and the first end of the twenty-first resistor connect to the current zero-crossing detection pin of the constant current drive chip.

The dimming pin of the constant current drive chip connects to the dimming control circuit.

The input pin of the constant current drive chip and the first end of the sixth capacitor connect to the first power supply end.

The compensation pin of the constant current drive chip, the first end of the seventh capacitor, and the first end of the eighth capacitor connect to the TRIAC signal detection circuit.

The second end of the eighth capacitor and the first end of the twenty-second resistor connect to the first end of the twentieth resistor.

The second end of the twentieth resistor, the first end of the fifth capacitor, and the first end of the seventeenth resistor connect.

The second end of the seventeenth resistor connects to the second end of the sixteenth resistor.

The second end of the fifth capacitor, the second end of the twenty-first resistor, the second end of the twenty-first resistor, the second end of the sixth capacitor, the second end of the twenty-second resistor, and the second end of the seventh capacitor connect to ground.

The drive pin of the constant current drive chip connects to the first end of the eighth resistor, the second end of the eighth resistor, the first end of the ninth resistor, and the cathode of the fifth diode connect.

The anode of the fifth diode, the second end of the ninth resistor, and the first end of the eleventh resistor connect to the control end of the first switch tube.

The current sampling pin of the constant current drive chip connects to the first end of the tenth resistor, the second end of the tenth resistor, the second end of the eleventh resistor, the first end of the twelfth resistor, the first end of the thirteenth resistor, the first end of the fourteenth resistor, and the first end of the fifteenth resistor, all connecting to the second end of the first switch tube.

The ground pin of the constant current drive chip, the second end of the twelfth resistor, the second end of the thirteenth resistor, the second end of the fourteenth resistor, and the second end of the fifteenth resistor all connect to ground.

In some embodiments, the output rectification and filtering circuit includes a sixth diode, a twenty-third resistor, a tenth capacitor, an eleventh capacitor, and a twelfth capacitor.

The anode of the sixth diode and the first end of the twenty-third resistor connect to the first end of the second secondary coil of the first transformer.

The second end of the twenty-third resistor connects to the first end of the twelfth capacitor.

The cathode of the sixth diode, the first end of the tenth capacitor, the first end of the eleventh capacitor, and the second end of the twelfth capacitor all connect to the anti-flicker circuit.

The second ends of the tenth capacitor and the eleventh capacitor connect to the second end of the second secondary coil of the first transformer.

Figure 7:
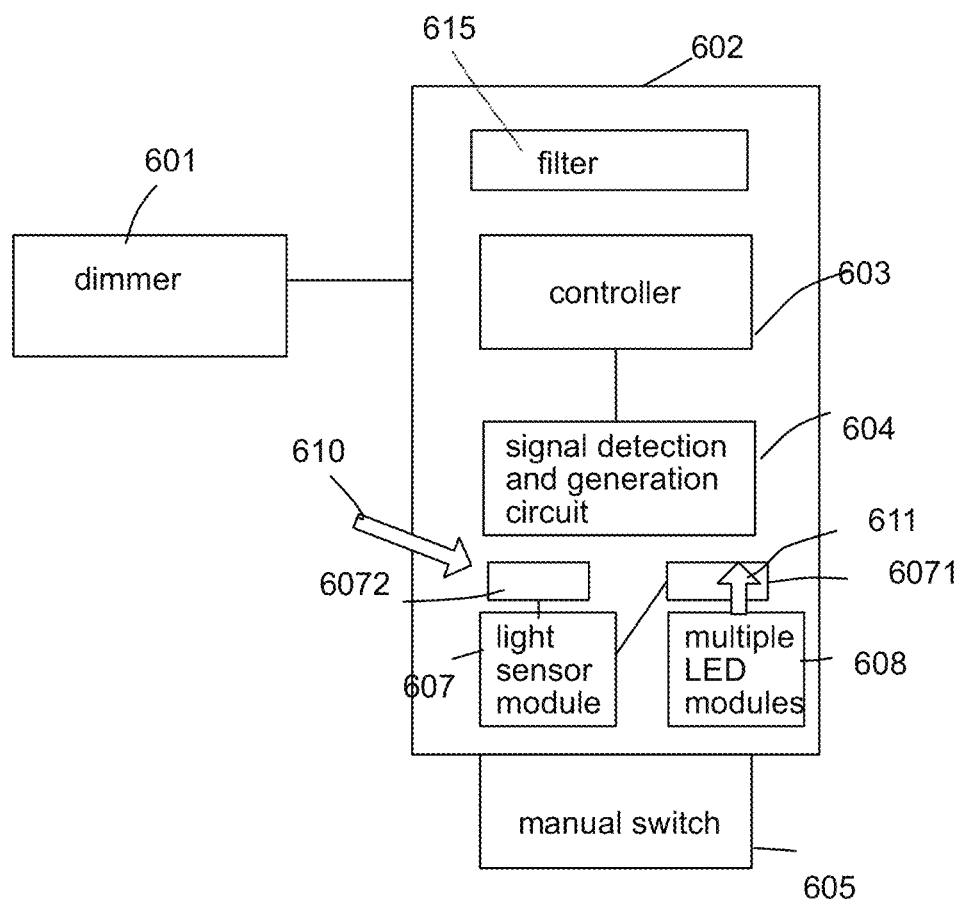
FIG. 7 illustrates another lighting apparatus embodiment.

In FIG. 7, the lighting apparatus may also include a controller 603.

The controller 603 is coupled to the signal detection and generation circuit 604.

The controller 603 determines a type of the dimmer 601.

The controller 603 applies the detected type to determine a corresponding control signal.

In some embodiments, the lighting apparatus may also include a manual switch 605 disposed on an exterior surface of a housing 602.

The housing 602 encloses the controller.

The manual switch 605 is coupled to the controller 603 for a user to manually disable automatic detection of the type of the dimmer 601.

The manual switch 605 is used for directly indicating the type of the dimmer 601.

In some embodiments, when the manual switch 605 directly indicates the type of the dimmer 601, the controller 603 indicates the output current limiting and filtering circuit to generate the output current according to the indicated type of the dimmer 601.

In some embodiments, the lighting apparatus may also include a light sensor module 607.

The light sensor module has a filter to detect light components of different spectrums.

In some embodiments, the lighting apparatus may also include multiple LED modules 608 of different optical parameters.

The controller 603 control driving currents supplied to the multiple LED modules 608 to obtain a required optical parameter of a mixed light of the multiple LED modules 608.

In some embodiments, the light sensor module 607 detects a first light 611 from of the multiple LED modules 608.

The light sensor module 607 also detects a second light 610 from ambient environment.

In some embodiments, the light sensor module has a first sensor unit 6071 disposed inside a housing that encloses the multiple LED modules.

The light sensor module has a second sensor unit 6072 faces to the ambient environment to collect the second light 610.

In some embodiments, the controller adjusts the mixed light of the multiple LED modules based on the detected first light and the detected second light.

In some embodiments, the controller adjusts a color temperature of the mixed light based on the detected first light and the detected second light.

In some embodiments, the controller adjusts a light intensity of the mixed light based on the detected first light and the detected second light.

In some embodiments, the controller has a filter 615 to delay response variation when a variation of the detected first light and the second light occurs. For example, the ambient light may vary for a temporary event, like a flash light passing by, but it should not react to quickly to prevent undesired change. Instead, the filter 615 may smooth the variation to help provide a stable control design.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

The invention claimed is:

1. A lighting apparatus coupled to a dimmer, comprising: an isolation transformer, wherein the homonymous terminal of the primary side opposes the homonymous terminal of the secondary side; an output rectification and voltage regulation circuit connected to the secondary coil of the isolation transformer, wherein the output rectification and voltage regulation circuit rectifies and stabilizes the voltage signal output by the isolation transformer; an output current limiting and filtering circuit connected to the dimmer and the output rectification and voltage regulation circuit, wherein the output current limiting and filtering circuit adjusts the output current and output voltage according to the operation of the dimmer, and the output current limiting and filtering circuit limits and filters the signal output by the output rectification and voltage regulation circuit; and a signal detection and generation circuit connected to the primary coil of the isolation transformer, wherein the signal detection and generation circuit generates a dimming control signal based on the induced current on the primary coil of the isolation transformer; wherein an input rectification and filtering circuit rectifies and filters the input current and then outputs a DC power supply signal, wherein a silicon-controlled dimmer interface connects between the input rectification and filtering circuit and the AC interface and is used for connecting to a TRIAC dimmer, wherein a constant current control circuit connects to the rectification and filtering circuit and the dimming control circuit and receives the DC power supply signal and the dimming control signal and converts the DC power supply signal into a constant current drive signal according to the dimming control signal, wherein an output rectification and filtering circuit connects to the constant current control circuit and receives the constant current drive signal and rectifies and filters the constant current drive signal, wherein an anti-flicker circuit connects between the output rectification and filtering circuit and the light source module and eliminates the ripple in the output current of the output rectification and filtering circuit and then outputs to the light source module, wherein a TRIAC signal detection circuit connects to the input rectification and filtering circuit and the constant current control circuit and detects the output voltage of the input rectification and filtering circuit to obtain the input detection voltage and generates a TRIAC detection signal according to the input detection voltage, wherein the constant current control circuit determines the access state of the dimmer according to the TRIAC detection signal and adjusts the constant current drive signal according to the access state of the dimmer.

2. The lighting apparatus of claim 1, wherein the isolation transformer is a 1:1 signal transmission isolation transformer.

3. The lighting apparatus of claim 1, wherein the output rectification and voltage regulation circuit includes a first diode and a first voltage regulator tube, wherein the anode of the first diode connects to the first end of the secondary coil of the isolation transformer, wherein the cathode of the first diode and the cathode of the first voltage regulator tube both connect to the first end of the output current limiting and filtering circuit, wherein the anode of the first voltage regulator tube connects to the second end of the secondary coil of the isolation transformer and the first common ground terminal.

4. The lighting apparatus of claim 1, wherein the output current limiting and filtering circuit includes a first capacitor, a second capacitor, and a first resistor, wherein the first ends of the first capacitor, the second capacitor, and the first resistor all connect to form the first end of the output current limiting and filtering circuit and connect to the output rectification and voltage regulation circuit, wherein the second end of the first resistor forms the second end of the output current limiting and filtering circuit and connects to the positive terminal of the dimmer, wherein the second ends of the first capacitor and the second capacitor both connect to form the third end of the output current limiting and filtering circuit and connect to the first common ground terminal and the negative terminal of the dimmer.

5. The lighting apparatus of claim 1, wherein the signal detection and generation circuit includes a second resistor and a second diode, wherein the first end of the second resistor connects to the first end of the primary coil of the isolation transformer, wherein the second end of the second resistor connects to the anode of the second diode, wherein the cathode of the second diode serves as the dimming control output end and outputs the dimming control signal, wherein the second end of the primary coil of the isolation transformer connects to the first power supply end.

6. The lighting apparatus of claim 1, wherein the driving circuit further includes an input protection circuit, wherein the input protection circuit connects between the input rectification and filtering circuit and the AC interface and provides overvoltage protection and overcurrent protection of the input current and then outputs to the input rectification and filtering circuit.

7. The lighting apparatus of claim 1, wherein the constant current control circuit includes a constant current drive chip, a third resistor, a fourth resistor, a fifth resistor, a sixth resistor, a seventh resistor, an eighth resistor, a ninth resistor, a tenth resistor, an eleventh resistor, a twelfth resistor, a thirteenth resistor, a fourteenth resistor, a fifteenth resistor, a sixteenth resistor, a seventeenth resistor, an eighteenth resistor, a twentieth resistor, a twenty-first resistor, a twenty-second resistor, a thirty-third resistor, a first switch tube, a third diode, a fourth diode, a fifth diode, a third capacitor, a fourth capacitor, a fifth capacitor, a sixth capacitor, a seventh capacitor, an eighth capacitor, and a first transformer, wherein the first ends of the third resistor, the fourth resistor, the third capacitor, and the first primary coil of the first transformer all connect to the input rectification and filtering circuit, wherein the second ends of the third resistor, the fourth resistor, the third capacitor, and the first end of the thirty-third resistor all connect, wherein the second end of the thirty-third resistor connects to the cathode of the third diode, wherein the first end of the first switch tube and the anode of the third diode connect to the second end of the primary coil of the first transformer, wherein the first and second ends of the first secondary coil of the first transformer connect to the output rectification and filtering circuit, wherein the first end of the second secondary coil of the first transformer and the first end of the fifth resistor form the second power supply end and connect to the first end of the eighteenth resistor, wherein the second end of the fifth resistor connects to the anode of the fourth diode, wherein the cathode of the fourth diode, the first end of the fourth capacitor, and the first end of the seventh resistor all connect to the high voltage pin of the constant current drive chip, wherein the second end of the second secondary coil of the first transformer and the second end of the fourth capacitor connect to ground, wherein the second end of the seventh resistor connects to the first end of the sixth resistor, wherein the second end of the sixth resistor forms the third power supply end and connects to the first end of the sixteenth resistor, wherein the second end of the eighteenth resistor connects to the first end of the nineteenth resistor, wherein the second end of the nineteenth resistor and the first end of the twenty-first resistor connect to the current zero-crossing detection pin of the constant current drive chip, wherein the dimming pin of the constant current drive chip connects to the dimming control circuit, wherein the input pin of the constant current drive chip and the first end of the sixth capacitor connect to the first power supply end, wherein the compensation pin of the constant current drive chip, the first end of the seventh capacitor, and the first end of the eighth capacitor connect to the TRIAC signal detection circuit, wherein the second end of the eighth capacitor and the first end of the twenty-second resistor connect to the first end of the twentieth resistor, wherein the second end of the twentieth resistor, the first end of the fifth capacitor, and the first end of the seventeenth resistor connect, wherein the second end of the seventeenth resistor connects to the second end of the sixteenth resistor, wherein the second end of the fifth capacitor, the second end of the twenty-first resistor, the second end of the twenty-first resistor, the second end of the sixth capacitor, the second end of the twenty-second resistor, and the second end of the seventh capacitor connect to ground, wherein the drive pin of the constant current drive chip connects to the first end of the eighth resistor, the second end of the eighth resistor, the first end of the ninth resistor, and the cathode of the fifth diode connect, wherein the anode of the fifth diode, the second end of the ninth resistor, and the first end of the eleventh resistor connect to the control end of the first switch tube, wherein the current sampling pin of the constant current drive chip connects to the first end of the tenth resistor, the second end of the tenth resistor, the second end of the eleventh resistor, the first end of the twelfth resistor, the first end of the thirteenth resistor, the first end of the fourteenth resistor, and the first end of the fifteenth resistor, all connecting to the second end of the first switch tube, wherein the ground pin of the constant current drive chip, the second end of the twelfth resistor, the second end of the thirteenth resistor, the second end of the fourteenth resistor, and the second end of the fifteenth resistor all connect to ground.

8. The lighting apparatus of claim 7, wherein the output rectification and filtering circuit includes a sixth diode, a twenty-third resistor, a tenth capacitor, an eleventh capacitor, and a twelfth capacitor, wherein the anode of the sixth diode and the first end of the twenty-third resistor connect to the first end of the second secondary coil of the first transformer, wherein the second end of the twenty-third resistor connects to the first end of the twelfth capacitor, wherein the cathode of the sixth diode, the first end of the tenth capacitor, the first end of the eleventh capacitor, and the second end of the twelfth capacitor all connect to the anti-flicker circuit, wherein the second ends of the tenth capacitor and the eleventh capacitor connect to the second end of the second secondary coil of the first transformer.

9. The lighting apparatus of claim 1, further comprising a controller, wherein the controller is coupled to the signal detection and generation circuit, wherein the controller determines a type of the dimmer, wherein the controller applies the detected type to determine a corresponding control signal.

10. The lighting apparatus of claim 9, further comprising a manual switch disposed on an exterior surface of a housing, wherein the housing encloses the controller, wherein the manual switch is coupled to the controller for a user to manually disable automatic detection of the type of the dimmer, wherein the manual switch is used for directly indicating the type of the dimmer.

11. The lighting apparatus of claim 10, wherein when the manual switch directly indicates the type of the dimmer, the controller indicates the output current limiting and filtering circuit to generate the output current according to the indicated type of the dimmer.

12. The lighting apparatus of claim 9, further comprising a light sensor module, wherein the light sensor module has a filter to detect light components of different spectrums.

13. The lighting apparatus of claim 12, further comprising multiple LED modules of different optical parameters, wherein the controller control driving currents supplied to the multiple LED modules to obtain a required optical parameter of a mixed light of the multiple LED modules.

14. The lighting apparatus of claim 13, wherein the light sensor module detects a first light from of the multiple LED modules, wherein the light sensor module also detects a second light from ambient environment.

15. The lighting apparatus of claim 14, wherein the light sensor module has a first sensor unit disposed inside a housing that encloses the multiple LED modules, wherein the light sensor module has a second sensor unit faces to the ambient environment to collect the second light.

16. The lighting apparatus of claim 14, wherein the controller adjusts the mixed light of the multiple LED modules based on the detected first light and the detected second light.

17. The lighting apparatus of claim 16, wherein the controller adjusts a color temperature of the mixed light based on the detected first light and the detected second light.

18. The lighting apparatus of claim 16, wherein the controller adjusts a light intensity of the mixed light based on the detected first light and the detected second light.

19. The lighting apparatus of claim 16, wherein the controller has a filter to delay response variation when a variation of the detected first light and the second light occurs.

* * * * *